US012387101B2

United States Patent
Li et al.

(10) Patent No.: US 12,387,101 B2
(45) Date of Patent: Aug. 12, 2025

(54) SYSTEMS AND METHODS FOR PRUNING BINARY NEURAL NETWORKS GUIDED BY WEIGHT FLIPPING FREQUENCY

(71) Applicant: ARIZONA BOARD OF REGENTS ON BEHALF OF ARIZONA STATE UNIVERSITY, Scottsdale, AZ (US)

(72) Inventors: Yixing Li, Tempe, AZ (US); Fengbo Ren, Tempe, AZ (US)

(73) Assignee: ARIZONA BOARD OF REGENTS ON BEHALF OF ARIZONA STATE UNIVERSITY, Scottsdale, AZ (US)

( * ) Notice: Subject to any disclaimer, the term of this patent is extended or adjusted under 35 U.S.C. 154(b) by 1129 days.

(21) Appl. No.: 17/317,300

(22) Filed: May 11, 2021

(65) Prior Publication Data
US 2021/0350242 A1 Nov. 11, 2021

Related U.S. Application Data

(60) Provisional application No. 63/022,913, filed on May 11, 2020.

(51) Int. Cl.
G06N 3/082 (2023.01)
G06N 3/047 (2023.01)

(52) U.S. Cl.
CPC .............. *G06N 3/082* (2013.01); *G06N 3/047* (2023.01)

(58) Field of Classification Search
CPC .......... G06N 3/082; G06N 3/047; G06N 3/04; G06N 3/063
See application file for complete search history.

(56) References Cited

FOREIGN PATENT DOCUMENTS

WO  WO-2020150678 A1 * 7/2020 ............. G06F 21/71

OTHER PUBLICATIONS

Helwegen et al, "Latent Weights Do Not Exist: Rethinking Binarized Neural Network Optimization", Jun. 5, 2019, arXiv, pp. 1-12 (Year: 2019).*
Alex Krizhevsky, Geoffrey Hinton, et al. Learning multiple layers of features from tiny images. Tech. rep. Citeseer, 2009.
Alex Krizhevsky, Ilya Sutskever, and Geoffrey E Hinton. "Imagenet classification with deep convolutional neural networks". In: Advances in neural information processing systems. 2012, pp. 1097-1105.
Dongqing Zhang et al. "Lq-nets: Learned quantization for highly accurate and compact deep neural networks". In: Proceedings of the European Conference on Computer Vision (ECCV). 2018, pp. 365-382.
Itay Hubara et al. "Binarized neural networks". In: Advances in neural information processing systems. 2016, pp. 4107-4115.
Jia Deng et al. "Imagenet: A large-scale hierarchical image database". In: 2009 IEEE conference on computer vision and pattern recognition. Ieee. 2009, pp. 248-255.

(Continued)

*Primary Examiner* — Alexey Shmatov
*Assistant Examiner* — Kyu Hyung Han
(74) *Attorney, Agent, or Firm* — MH2 Technology Law Group, LLP (57) ABSTRACT

Various embodiments of a system and method for pruning binary neural networks by analyzing weight flipping frequency and pruning the binary neural network based on the weight flipping frequency associated with each channel of the binary neural network are disclosed herein.

16 Claims, 5 Drawing Sheets

(56) References Cited

OTHER PUBLICATIONS

Jian-Hao Luo, Jianxin Wu, and Weiyao Lin. "Thinet: A filter level pruning method for deep neural network compression". In: Proceedings of the IEEE international conference on computer vision. 2017, pp. 5058-5066.
Matthieu Courbariaux, Yoshua Bengio, and Jean-Pierre David. "Binaryconnect: Training deep neural networks with binary weights during propagations". In: Advances in neural information processing systems. 2015, pp. 3123-3131.
Min Lin, Qiang Chen, and Shuicheng Yan. "Network in network". In: arXiv preprint arXiv:1312.4400 (2013).
Mohammad Rastegari et al. "Xnor-net: Imagenet classification using binary convolutional neural networks". In: European Conference on Computer Vision. Springer. 2016, pp. 525-542.
Paulius Micikevicius et al. "Mixed precision training". In: International Conference on Learning Representations (2018).
Pavlo Molchanov et al. "Importance estimation for neural network pruning". In: Proceedings of the IEEE Conference on Computer Vision and Pattern Recognition. 2019, pp. 11264-11272.
Raghuraman Krishnamoorthi. "Quantizing deep convolutional networks for efficient inference: A whitepaper". In: arXiv preprint arXiv:1806.08342 (2018).
Ruichi Yu et al. "Nisp: Pruning networks using neuron importance score propagation". In: Proceedings of the IEEE Conference on Computer Vision and Pattern Recognition. 2018, pp. 9194-9203.
Saman Biookaghazadeh, Ming Zhao, and Fengbo Ren. "Are FPGAs suitable for edge computing?" In: {USENIX} Workshop on Hot Topics in Edge Computing (HotEdge 18). 2018.
Shuang Liang et al. "FP-BNN: Binarized neural network on FPGA". In: Neurocomputing 275 (2018), pp. 1072-1086.
Shuchang Zhou et al. "Dorefa-net: Training low bitwidth convolutional neural networks with low bitwidth gradients". In: arXiv preprint arXiv:1606.06160 (2016).
Song Han, Huizi Mao, and William J Dally. "Deep compression: Compressing deep neural networks with pruning, trained quantization and huffman coding". In: International Conference on Learning Representations (2016).
Yuwei Hu et al. "Bitflow: Exploiting vector parallelism for binary neural networks on cpu". In: 2018 IEEE International Parallel and Distributed Processing Symposium (IPDPS). IEEE. 2018, pp. 244-253.
Zhuang Liu et al. "Rethinking the value of network pruning". In: arXiv preprint arXiv:1810.05270 (2018).

* cited by examiner

FIG. 1

PRUNING INTERVAL

SYSTEMS AND METHODS FOR PRUNING BINARY NEURAL NETWORKS GUIDED BY WEIGHT FLIPPING FREQUENCY

CROSS-REFERENCE TO RELATED APPLICATIONS

This is a non-provisional application that claims benefit to U.S. Provisional Patent Application Ser. No. 63/022,913 filed 11 May 2020, which is herein incorporated by reference in its entirety.

GOVERNMENT SUPPORT

This invention was made with government support under grant no. 1652038 awarded by the National Science Foundation. The government has certain rights in the invention.

FIELD

The present disclosure generally relates to binary neural networks, and in particular, to a system and method for pruning binary neural networks guided by weight flipping frequency.

BACKGROUND

Binary Neural Networks (BNN) are an extreme case of a quantized neural network, which adopts binarized representations of weights and exclusive NOR (XNOR) operations as binary convolution. By applying binary constraints on deep neural networks, the existing studies have shown up to 12×, 5×, 16× speedup on a CPU, GPU, and field-programmable gate array (FPGA) implementation, respectively, compared with its 16/32-bit floating-point counterpart. A popular method to compress neural networks is pruning. Pruning methods help to remove insensitive weights and/or connections of a network. Since quantization and pruning are independent of each other, they could be jointly applied. Existing work has already shown promising results of combining a 4-bit quantization with pruning for a deep compression. However, there has been no study that explores the pruning of BNNs. The major challenges of pruning BNNs are two-fold. First, as both 0s and 1s are non-trivial in BNNs, it is not proper to adopt any existing pruning method of full-precision networks that interprets 0s as trivial. A new indicator is needed to identify the weights insensitive to network accuracy. Second, unstructured pruning can hardly result in any saving for BNNs as one has to introduce memory overhead to label the prunable weights that only have 1 bit. Therefore, a solution that avoids unstructured pruning is needed.

It is with these observations in mind, among others, that various aspects of the present disclosure were conceived and developed.

Corresponding reference characters indicate corresponding elements among the view of the drawings. The headings used in the figures do not limit the scope of the claims.

DETAILED DESCRIPTION

A binary neural network (BNN) is a compact form of neural network. Weights and activations in BNNs can be binary values, which leads to a significant reduction in both parameter size and computational complexity compared to their full-precision counterparts. Such reductions can directly translate into reduced memory footprint and computation cost in hardware, making BNNs highly suitable for a wide range of hardware accelerators. However, it is unclear whether and how a BNN can be further pruned for ultimate compactness. As both 0s and 1s are non-trivial in BNNs, it is not proper to adopt any existing pruning method of full-precision networks that interprets 0s as trivial. This disclosure describes a pruning method tailored to BNNs that considers weight flipping frequency as an indicator of sensitivity to accuracy. The experiments performed on the binary versions of a 9-layer Network-in-Network (NIN) and the AlexNet with the CIFAR-10 dataset show that the disclosed BNN-pruning method can achieve 20-40% reduction in binary operations with 0.5-1.0% accuracy drop, which leads to a 15-40% runtime speedup on a TitanX GPU. Referring to the drawings, embodiments of a method of pruning a binary neural network are respectively illustrated and generally indicated as 100 in FIGS. 1-5.

A computer-implemented BNN-pruning method 100 that considers a weight flipping frequency as an indicator to analyze a sensitivity of binary weights of a BNN to accuracy is disclosed herein. Through experiments, it is validated that the weights with a high weight flipping frequency, when the training is sufficiently close to convergence, are less sensitive to accuracy. To avoid unstructured pruning, the method 100 shrinks a number of channels in each layer of a plurality of layers of a BNN by the same percentage of the insensitive weights to reduce the effective size of the BNN for further fine tuning. The experiments performed on the binary versions of a 9-layer Network-in-Network (NIN) and the AlexNet with the CIFAR-10 dataset show that the disclosed BNN-pruning method 100 can achieve 20-40% reduction in binary operations with 0.5-1.0% accuracy drop, which leads to a 15-40% runtime speedup on a TitanX GPU.

To tackle the above-mentioned problems, the BNN-pruning method 100 adopts a weight flip frequency (f) parameter as an indicator of the sensitivity of binary weights to accuracy to guide the pruning of BNNs. It is empirically validated that high and low f respectively indicate a low and high sensitivity of binary weights to accuracy. Therefore, f is an effective indicator for identifying the binary weights that have a high criticality to pruning and can be pruned with a well-bounded accuracy drop.

Weight Flip Frequency

Figure 1:
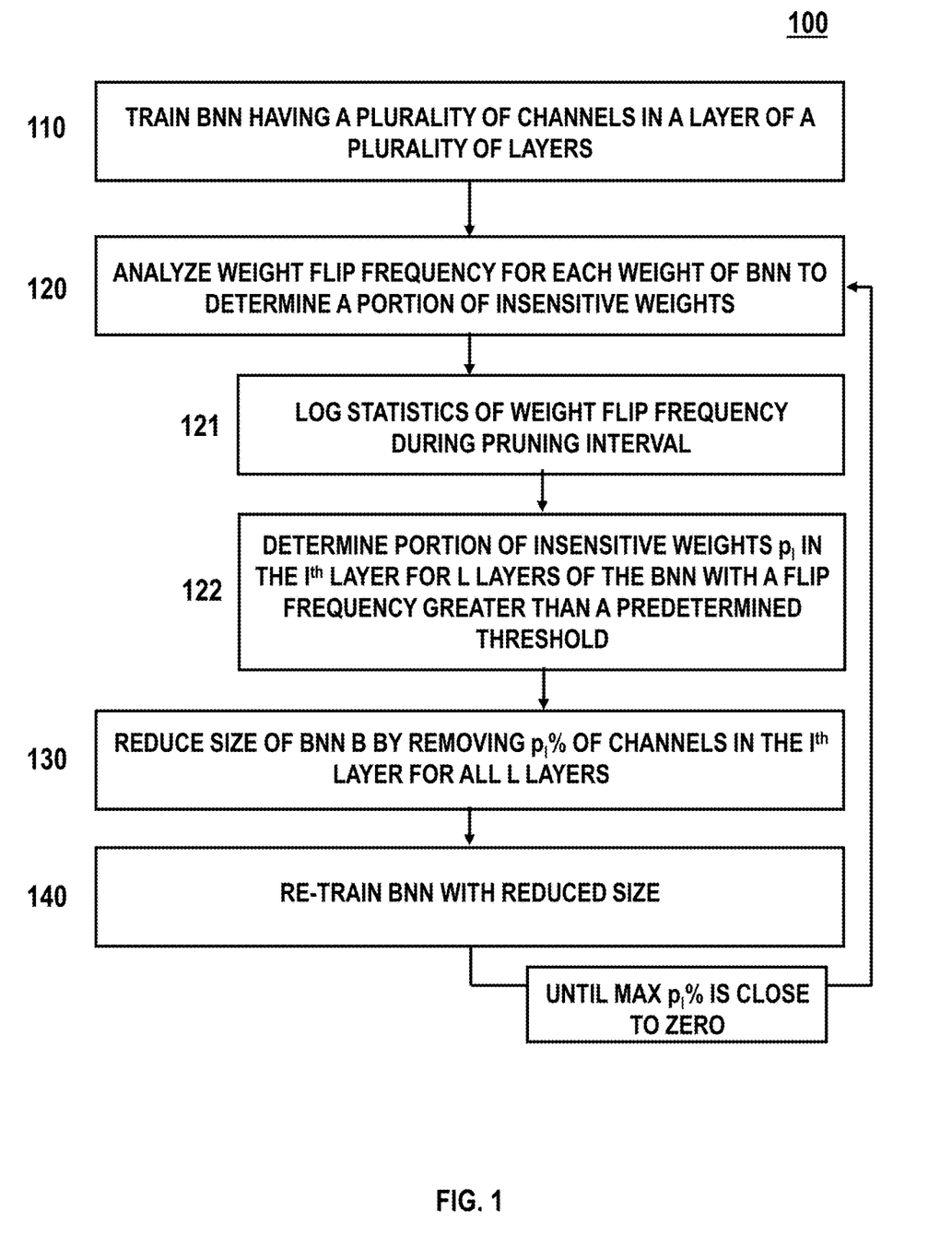
FIG. 1 is a flowchart showing a methodology for pruning binary neural networks.
Figure 2:
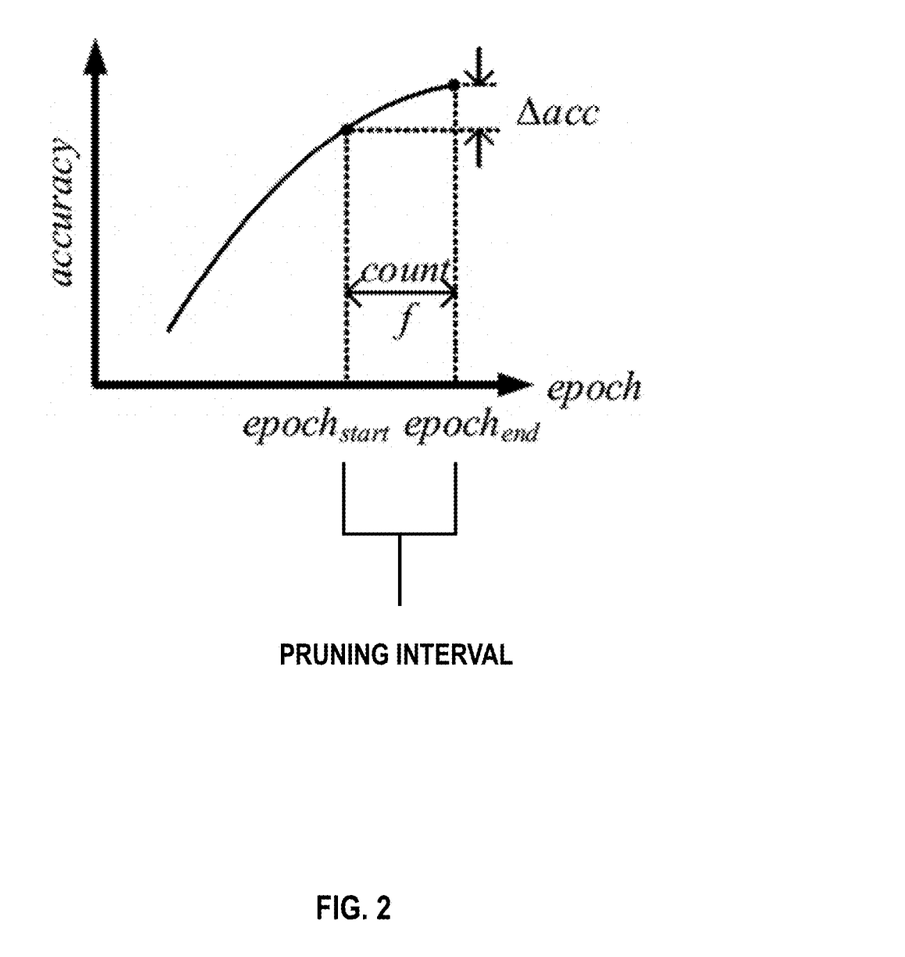
FIG. 2 is a graphical representation showing accuracy during a specified training interval, where weight flipping values are observed during this training interval.

Referring to FIGS. 1-2, in the present disclosure, f is defined as the flipping count of a weight during a specified last pruning interval of training (from $epoch_{start}$ to $epoch_{end}$). For BNNs, weight flipping means that a weight value switches from 0/−1 to 1 or 1 to 0/−1. During the specified pruning interval, for a weight of the plurality of weights, f is increased by 1 whenever a value of the weight flips. It is hypothesized that, toward the end of a training session for a BNN, the last few percent of accuracy gain stems from updating weights with a high weight flipping frequency, and these weights have little influence on the accuracy that has already been established. Therefore, f can be used as an indicator of the sensitivity of a binary weight of a plurality of binary weights to accuracy, as well as its criticality to pruning. Weights with an f value being equal to 0 or 1 remain stable or become stable towards the end of a training session, which implies that, if one flips their values, it is most likely to hurt the accuracy of the resultant trained BNN. On the contrary, an f value being high or hitting an upper bound (such as if the weight flips at every iteration) means that the values of a group of "noisy weights" having high f values most likely have little influence on the accuracy gain over the entire training session. Such behavior can be interpreted as that the training session is trying to fine-tune these "noisy weights" to further shape the decision boundary of classification but failed as they turned out to have little impact on the accuracy gain.

Figure 4:
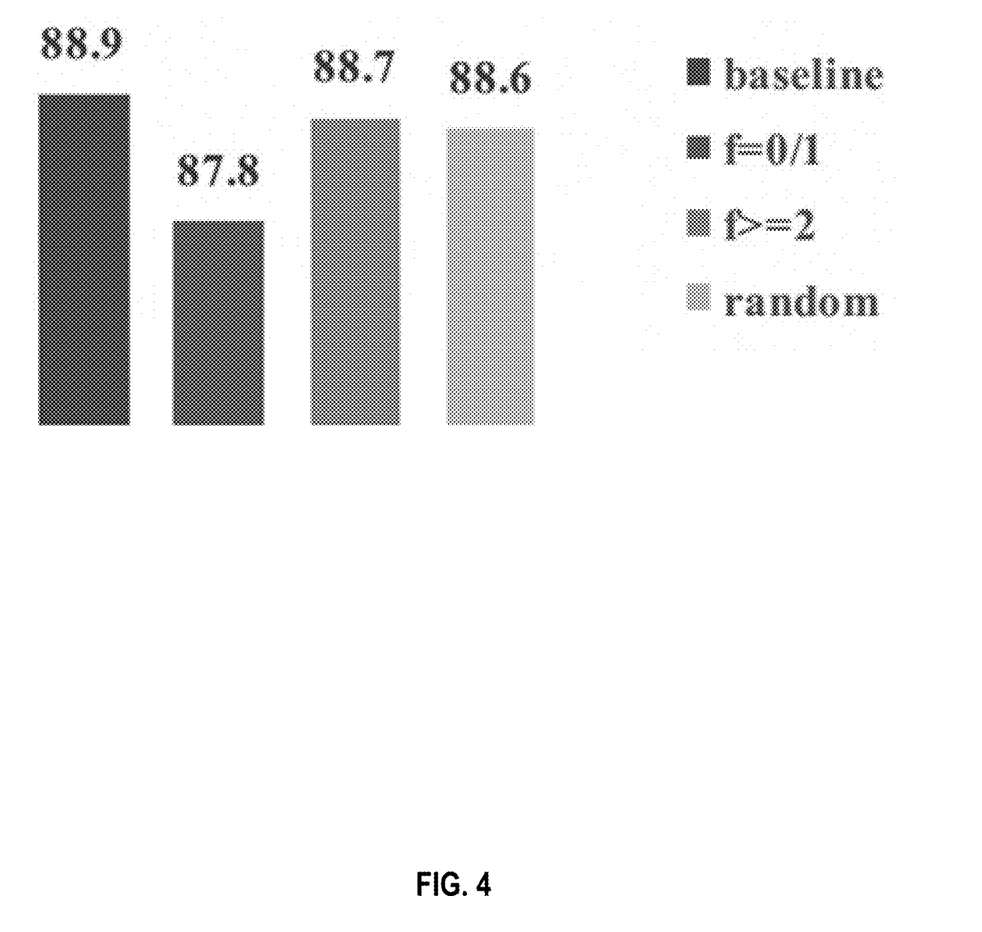
FIG. 4 is a graphical representation showing accuracy comparison when randomizing different groups of weights.

Experimentation was conducted on the CIFAR-10 dataset with a 9-layer binarized NIN. The training interval for f analysis was set as the epoch range that contribute to the last 1% of accuracy gain toward the end of training. The weights were grouped into three groups. The $1^{st}$ and $2^{nd}$ group of weights satisfies f=0/1 and f=2, respectively. The $3^{rd}$ group of weights contained the same amount of weights as the $1^{st}$ group, but were randomly selected from the entire weight set. FIG. 4 shows the accuracy comparison when randomizing different groups of weights during inference. Note that only weight randomization was performed in the experiments, and no fine-tuning of the weights was performed after the randomization. The results were averaged over ten trials. The experiment results show a 1.1% gap between the baseline model and the one with the $1^{st}$ group of weights randomized. Also, randomizing the $1^{st}$ group of weights achieved even lower accuracy than randomizing the same amount of randomly selected weights (the $3^{rd}$ group).

These results indicate that the $1^{st}$ group of weights, where f is equal to 0 or 1, is the most sensitive to the final accuracy rate, while the $2^{nd}$ group of weights with a high f has little impact. This validates the hypothesis and suggests that 2 is a viable threshold for identifying prunable binary weights.

BNN Compression Flow

A process flow 100 showing the method BNN pruning method is shown in FIG. 1. FIG. 2 illustrates a pruning interval during which f analysis shall be performed. Δacc is the accuracy drop tolerance defined by the user. In some embodiments, the pruning interval is selected to be an epoch range that contributes to the last 1% of accuracy gain toward the end of training. $epoch_{end}$ is the final epoch of the pruning interval. $epoch_{start}$ is the starting point of f analysis, where the accuracy at $epoch_{start}$ is Δacc lower than the final accuracy at $epoch_{end}$.

As shown at block 110 of FIG. 1, a BNN is trained from scratch. In the case of a pre-trained BNN model is available, the pruning interval of training (from $epoch_{start}$ to $epoch_{end}$) needs to be performed again for the purpose of f analysis.

Referring to block 120, a next step a the weight flip frequency f of the BNN is analyzed. In particular, at sub-block 121, the statistics of f for each weight are logged during the pruning interval from $epoch_{start}$ to $epoch_{end}$. Subsequently, at sub-block 122, the portion of insensitive weights ($p_l$%) is calculated in the $L^{th}$ layer that satisfy f≥2 for each layer. Other threshold values can be selected based on the application, however; the value f≥2 was empirically selected for one particular embodiment.

As shown at block 130, the size of the BNN is reduced by shrinking the number of channels in the $L^{th}$ layer by $p_l$%. At block 140, the BNN is retrained at the reduced size. Blocks 120-140 are repeated in an iterative fashion until a maximum percentage of insensitive weights (pl %) is close to 0, which indicates that there is no room for further compression. Preserving the pruned architecture and fine-tuning the inherited weights in BNN pruning are not recommended for two main reasons. First, the insensitive weights are found to be sparsely distributed and unstructured in the experiments. Unstructured pruning can hardly result in any savings for BNNs as one has to introduce memory overhead to label the prunable weights that only have 1 bit as well as extra logic for manipulating the memory points to skip the corresponding computation. Second, prior work shows that retraining inherited weights in conventional pruning methods typically does not produce better performance than simply training a smaller model from scratch. Therefore, reducing the size of the BNN network is recommended at each layer guided by the f analysis and pl % and retraining the smaller BNN model in BNN pruning. Comparing to the intuitive approach of exploring the appropriate network size through binary search, the disclosed BNN-pruning method 100 can quantitatively analyze the layer-wise redundancy to effectively reduce the BNN size, which greatly reduces the search space and time.

Figure 3:
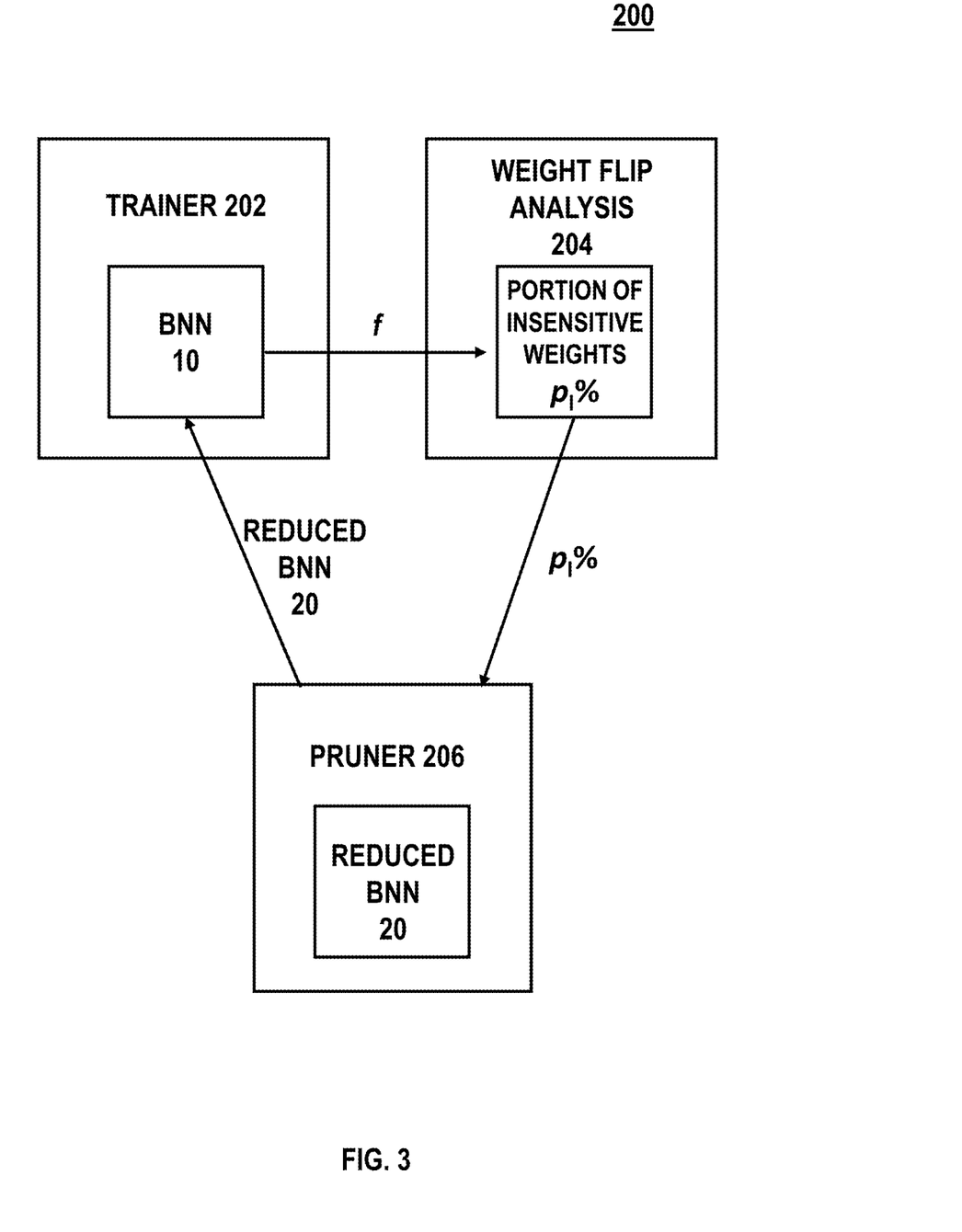
FIG. 3 is a block diagram showing a pruning system for implementation of the method of FIG. 1.

FIG. 3 illustrates a schematic block diagram 200 showing operation and data flow for a pruning system for implementation of the method 100. At a high level, the BNN 10 is trained at a trainer 202. Flip count f for each channel in each layer of the BNN 10 is determined during the pruning interval. At weight flip analysis block 204, the portion of insensitive weights $p_l$% is determined for each layer l based on the flip count f for each channel in the layer. At pruner 206, the previously-trained BNN 10 is reduced by removing the amount of channels in each layer corresponding to a portion of the insensitive weights in each layer to generate reduced BNN 20. The reduced BNN 20 is then re-trained at trainer 202. This cycle is repeated until a maximum pi % value is minimized.

Experiment and Results

The disclosed BNN-pruning method 100 was implemented with the CIFAR-10 dataset on two BNNs: the binary versions of a 9-layer binarized NIN and the AlexNet. The binarization method used herein was introduced by the XNOR-net.

As shown in FIG. 4, the first set of experiments were conducted on the binarized NIN. The network architecture used in the experiment is shown in Table I. Table I also shows the layer-wise pruning results in four iterations of BNN pruning. Note that the $1^{st}$ and the last layer are floating-point layers, and pruning is not applied. In each iteration, the target Δacc is set to 0.5%. After four iterations of BNN pruning, the final network model has a 20% reduction in GOPs (Giga-operations). The accuracy of the baseline model is 86.5%, and the accuracy of the final network model is subject to the target accuracy drop of 0.5%. Compared with directly performing a binary search for the appropriate network size, the disclosed BNN-pruning method 100 can provide a layer-wise, quantitative guideline to effectively shrink the BNN size. For the runtime evaluation, the layer-wise runtime of the binarized NIN was tested using an optimized binary kernel on an NVIDIA TitanX GPU. The final network model after BNN pruning leads to a 15% runtime speedup as compared to the baseline model.

TABLE I

THE LAYER-WISE BNN-PRUNING RESULTS OF THE BINARIZED NIN AT EACH ITERATION.

| | | | $N^{th}$ iteration | | | | | | |
|---|---|---|---|---|---|---|---|---|---|
| | | base- | $1^{st}$ | | $2^{nd}$ | | $3^{rd}$ | | $4^{th}$ | |
| layer | filter | line | $p_L$/% | channels | $p_L$/% | channels | $p_L$/% | channels | $p_L$/% | channels |
| conv2d | 5x5 | 192 | N/A | 192 | N/A | 192 | N/A | 192 | N/A | 192 |
| binconv2d | 1x1 | 160 | 5.0 | 152 | 5.9 | 143 | 0.7 | 142 | 3.5 | 137 |
| binconv2d | 1x1 | 96 | 5.2 | 91 | 5.5 | 86 | 1.2 | 85 | 4.7 | 81 |
| | | | | | pooling | | | | | |
| binconv2d | 5x5 | 192 | 1.5 | 189 | 1.1 | 187 | 0.5 | 187 | 1.0 | 185 |
| binconv2d | 1x1 | 192 | 9.9 | 173 | 5.8 | 163 | 3.1 | 158 | 6.3 | 148 |
| binconv2d | 1x1 | 192 | 3.1 | 186 | 2.7 | 181 | 0.6 | 180 | 2.2 | 176 |
| | | | | | pooling | | | | | |
| binconv2d | 3x3 | 192 | 1.6 | 189 | 1.1 | 187 | 0.5 | 187 | 1.1 | 185 |
| binconv2d | 1x1 | 192 | 4.2 | 182 | 4.9 | 173 | 1.2 | 171 | 3.5 | 165 |
| conv2d | 1x1 | 10 | N/A | 10 | N/A | 10 | N/A | 10 | N/A | 10 |
| | | | | | pooling | | | | | |
| GOPs (M) | | 220 | | 206 | | 193 | | 190 | | 180 |

TABLE II

EXPERIMENT RESULTS OF BNN PRUNING

| Arch | GOPs reduction | Speedup | Δacc |
|---|---|---|---|
| NIN | 20% | 15% | 0.5% |
| AlexNet | 40% | 25% | 1.0% |

In addition, the disclosed BNN-pruning method 100 was tested on the binarized AlexNet with the CIFAR-10 dataset. In this set of experiments, the target Δacc was set to 1.0%. After three iterations of BNN pruning, the final network model results in a 40% GOPs reduction and a 25% runtime speedup on an NVIDIA TitanX GPU, subject to the 1.0% target accuracy drop. The BNN pruning results and their impact on runtime speedup are summarized in Table II. Overall, the experiment results show that using the weight flipping frequency as the indicator of weight sensitivity to guide BNN pruning can lead to 20-40% GOPs reduction and 15-25% runtime speedup at the limited cost of 0.5-1.0% accuracy drop.

The weight flipping frequency f is an effective indicator of the sensitivity of binary weights to accuracy and their criticality to pruning. Reducing the BNN size by shrinking the number of channels in the $L^{th}$ layer by a factor of $p_l$% is the key to effectively removing redundancy in BNN pruning.

Figure 5:
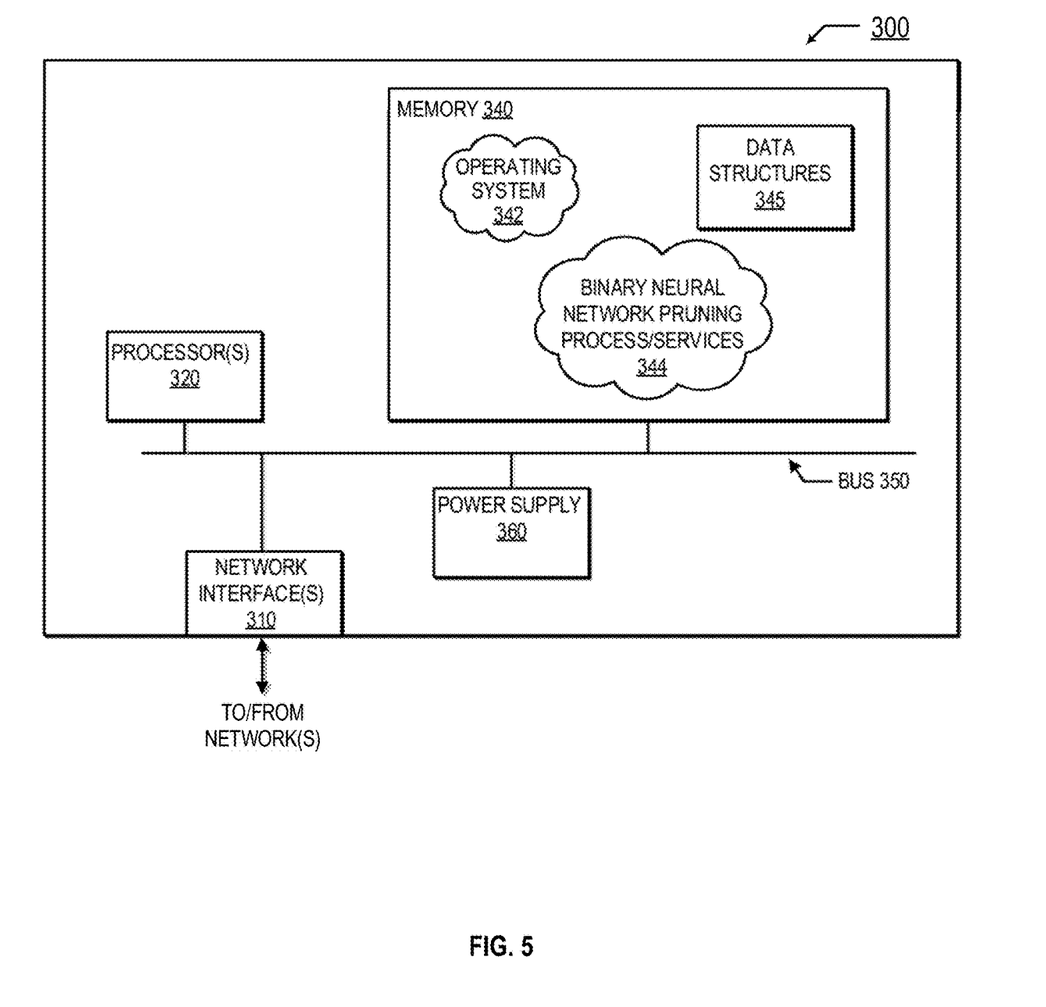
FIG. 5 is a simplified diagram showing an example computing system for implementation of the method of FIG. 1.

FIG. 5 is a schematic block diagram of an example device 300 that may be used with one or more embodiments described herein, e.g., as a component of method 100.

Device 300 comprises one or more network interfaces 310 (e.g., wired, wireless, PLC, etc.), at least one processor 320, and a memory 340 interconnected by a system bus 350, as well as a power supply 360 (e.g., battery, plug-in, etc.).

Network interface(s) 310 include the mechanical, electrical, and signaling circuitry for communicating data over the communication links coupled to a communication network. Network interfaces 310 are configured to transmit and/or receive data using a variety of different communication protocols. As illustrated, the box representing network interfaces 310 is shown for simplicity, and it is appreciated that such interfaces may represent different types of network connections such as wireless and wired (physical) connections. Network interfaces 310 are shown separately from power supply 260; however, it is appreciated that the interfaces that support PLC protocols may communicate through power supply 360 and/or may be an integral component coupled to power supply 360.

Memory 340 comprises a plurality of storage locations that are addressable by processor 320 and network interfaces 310 for storing software programs and data structures associated with the embodiments described herein. In some embodiments, device 300 may have limited memory or no memory (e.g., no memory for storage other than for programs/processes operating on the device and associated caches).

Processor 320 comprises hardware elements or logic adapted to execute the software programs (e.g., instructions) and manipulate data structures 345. An operating system 342, portions of which are typically resident in memory 340 and executed by the processor, functionally organizes device 300 by, inter alia, invoking operations in support of software processes and/or services executing on the device. These software processes and/or services may comprise BNN pruning process/services 344, described herein and corresponding to method 100 and block diagram 200. Note that while BNN pruning process 344 is illustrated in centralized memory 340, alternative embodiments provide for the process to be operated within the network interfaces 310, such as a component of a MAC layer, and/or as part of a distributed computing network environment.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules or engines configured to operate in accordance with the techniques herein (e.g., according to the functionality of a similar process). In this context, the term module and engine may be interchangeable. In general, the term module or engine refers to model or an organization of interrelated software components/functions. Further, while the BNN pruning process 344 is shown as a standalone process, those skilled in the art will appreciate that this process may be executed as a routine or module within other processes.

It should be understood from the foregoing that, while particular embodiments have been illustrated and described, various modifications can be made thereto without departing from the spirit and scope of the invention as will be apparent to those skilled in the art. Such changes and modifications are within the scope and teachings of this invention as defined in the claims appended hereto.

What is claimed is:

1. A method, comprising:
providing a computer-implemented binary neural network, the neural network including a plurality of layers, each layer of the plurality of layers including a respective plurality of channels, each channel associated with a respective weight, wherein each weight of the plurality of weights is a binary value;
logging a flip count for each weight of the plurality of weights of the neural network during a pruning interval of a neural network training session, wherein a flip count for a respective weight comprises a count of a number of flips of the respective weight;
determining a portion of weights for each layer of the neural network that have a flip count greater than a predetermined value during the pruning interval; and
removing a portion of channels of the neural network corresponding to the portion of weights that have a flip count greater than the predetermined value during the pruning interval to generate a reduced neural network; and
training the reduced neural network.

2. The method of claim 1, wherein the method is iteratively repeated until a maximum of the portion of insensitive weights is minimized.

3. The method of claim 1, wherein the portion of channels which are removed from the neural network is proportional to the portion of insensitive weights.

4. The method of claim 3, wherein a number of channels in an l.sup.th layer of the neural network is reduced by the portion of insensitive weights for the l.sup.th layer.

5. The method of claim 1, wherein the pruning interval is defined as an interval during the training session that contributes to a final amount of accuracy gain towards an end of the training session.

6. The method of claim 1, wherein the flip count for a weight of the plurality of weights is a number of times within the pruning interval of the training session that a value of the weight is altered.

7. The method of claim 1, wherein the predetermined value is empirically selected.

8. The method of claim 1, wherein the predetermined value is 2.

9. A computer-implemented neural network pruning system, comprising:
a computer-implemented binary neural network, the neural network including a plurality of layers, each layer of the plurality of layers including a respective plurality of channels, each channel associated with a respective weight, wherein each weight of the plurality of weights is a binary value;
a processor in communication with a tangible storage medium storing instructions that are executed by the processor to perform operations comprising:
log a flip count for each weight of the plurality of weights of the neural network during a pruning interval of a neural network training session, wherein a flip count for a respective weight comprises a count of a number of flips of the respective weight;
determine a portion of weights for each layer of the neural network that have a flip count greater than a predetermined value during the pruning interval; and
remove a portion of channels of the neural network corresponding to the portion of weights that have a flip count greater than the predetermined value during the pruning interval to generate a reduced neural network; and
train the reduced neural network.

10. The pruning system of claim 9, wherein the operations are iteratively repeated until a maximum of the portion of insensitive weights is minimized.

11. The pruning system of claim 9, wherein the portion of channels which are removed from the neural network is proportional to the portion of insensitive weights.

12. The pruning system of claim 11, wherein a number of channels in an l.sup.th layer of the neural network is reduced by the portion of insensitive weights for the l.sup.th layer.

13. The pruning system of claim 9, wherein the pruning interval is defined as an interval during the training session that contributes to a final amount of accuracy gain towards an end of the training session.

14. The pruning system of claim 9, wherein the flip count for a weight of the plurality of weights is a number of times within the pruning interval of the training session that a value of the weight is altered.

15. The pruning system of claim 9, wherein the predetermined value is empirically selected.

16. The method of claim 9, wherein the predetermined value is 2.

* * * * *

UNITED STATES PATENT AND TRADEMARK OFFICE
CERTIFICATE OF CORRECTION

PATENT NO. : 12,387,101 B2  
APPLICATION NO. : 17/317300  
DATED : August 12, 2025  
INVENTOR(S) : Yixing Li et al.

Page 1 of 1

It is certified that error appears in the above-identified patent and that said Letters Patent is hereby corrected as shown below:

In the Claims

At Column 7, Line 38, "l.sup.th" should be -- $L^{th}$ --;  
At Column 7, Line 39, "l.sup.th" should be -- $L^{th}$ --;  
At Column 8, Line 35, "l.sup.th" should be -- $L^{th}$ --;  
At Column 8, Line 36, "l.sup.th" should be -- $L^{th}$ --.

Signed and Sealed this  
Sixteenth Day of September, 2025

Coke Morgan Stewart  
*Acting Director of the United States Patent and Trademark Office*